United States Patent
Mostofi et al.

(10) Patent No.: US 10,033,472 B2
(45) Date of Patent: *Jul. 24, 2018

(54) SYSTEM AND METHOD OF OCCUPANCY ESTIMATION UTILIZING TRANSMITTED SIGNALS

(71) Applicant: The Regents of the University of California, Oakland, CA (US)

(72) Inventors: Yasamin Mostofi, Goleta, CA (US); Arjun Muralidharan, Goleta, CA (US); Saandeep Depatla, Goleta, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/841,788

(22) Filed: Dec. 14, 2017

(65) Prior Publication Data

US 2018/0109339 A1    Apr. 19, 2018

Related U.S. Application Data

(63) Continuation of application No. 15/087,554, filed on Mar. 31, 2016, now Pat. No. 9,866,337.

(60) Provisional application No. 62/140,847, filed on Mar. 31, 2015.

(51) Int. Cl.
   *H04B 17/00* (2015.01)
   *H04B 17/318* (2015.01)
   *H04W 24/08* (2009.01)

(52) U.S. Cl.
   CPC .......... *H04B 17/318* (2015.01); *H04W 24/08* (2013.01)

(58) Field of Classification Search
   CPC .. H04B 7/0452; H04B 17/318; H04B 1/1036; H04B 1/7097; H04B 1/71635; H04B 1/71637; H04B 1/719; H04B 13/005; H04B 17/345; H04B 1/0003; H04B 1/38; H04B 5/0031; H04B 5/0062; H04B 7/024
   USPC ....................................... 455/67.12
   See application file for complete search history.

(56) References Cited

U.S. PATENT DOCUMENTS

| | | | | |
|---|---|---|---|---|
| 2009/0043504 | A1* | 2/2009 | Bandyopadhyay | G01C 17/38 701/469 |
| 2010/0299116 | A1* | 11/2010 | Tomastik | G06K 9/00771 703/2 |
| 2014/0119160 | A1* | 5/2014 | Shilling | G01S 15/04 367/93 |
| 2016/0110833 | A1* | 4/2016 | Fix | G06Q 50/265 705/324 |

OTHER PUBLICATIONS

Adib, et al., "Multi-person motion tracking via rf body reflections", 2014.

(Continued)

*Primary Examiner* — Ajibola Akinyemi
(74) *Attorney, Agent, or Firm* — Billion & Armitage; Michael A. Collins

(57) ABSTRACT

A method estimating number of occupants in a region includes receiving at one or more receiving unit a signal or signals transmitted from one or more transmitting units, wherein the transmitting units are not associated with the one or more occupants located in the region. In addition, the method includes measuring one or more attributes of the received signal for a duration of time and calculating an occupancy estimate based, at least in part, on the measured attribute of the received signal.

19 Claims, 13 Drawing Sheets

(56) References Cited

OTHER PUBLICATIONS

Agarwal, et al., "Occupancy-driven energy management for smart building automation", In Proceedings of the 2nd ACM Workshop on Embedded Sensing Systems for Energy-Efficiency in Building, pp. 1-6. ACM, 2010.

Gonzalez-Ruiz, et al., "An integrated framework for obstacle mapping with see-through capabilities using laser and wireless channel measurements", IEEE Sensors Journal, 14(1):25-38, 2014.

He, et al., "A regression-based radar-mote system for people counting", In Pervasive Computing and Communications (PerCom), 2014 IEEE International Conference on, pp. 95-102.IEEE, 2014.

Jakeman, et al., "A model for non-rayleigh sea echo", Antennas and Propagation, IEEE Transactions on, 24 (6):806-814, 1976.

Kannan, et al., "Low cost crowd counting using audio tones", In Proceedings of the 10th ACM Conference on Embedded Network Sensor Systems, pp. 155-168. ACM, 2012.

Kim, et al., "Estimating the number of people in crowded scenes", In IS&T/SPIE Electronic Imaging, pp. 78820L-78820L. International Society for Optics and Photonics, 2011.

Li, et al., "Estimating the number of people in crowded scenes by mid based foreground segmentation and head-shoulder detection", In Pattern Recognition, 2008. ICPR 2008. 19th International Conference on, pp. 1-4. IEEE, 2008.

Lin, et al., "Estimation of number of people in crowded scenes using perspective transformation", Systems, Man and Cybernetics, Part A: Systems and Humans, IEEE Transactions on, 31(6):645-654, 2001.

LV, et al., "Multi-target human sensing via uwb bio-radar based on multiple antennas", In TENCON 2013-2013 IEEE Region 10 Conference (31194), pp. 1-4. IEEE, 2013.

Mostofi, "Cooperative wireless-based obstacle/object mapping and see-through capabilities in robotic networks", Mobile Computing, IEEE Transactions on, 12(5):817-829, 2013.

Niakatsuka, et al., "A study on passive crowd density estimation using wireless sensors".

Nguyen, et al., "Energy intelligent buildings based on user activity: A survey", Energy and buildings, 56:244-257, 2013.

Ni, et al., "LAND-MARC: indoor location sensing using active rid", Wireless networks, 10(6):701-710, 2004.

Pu, et al., "Whole-home gesture recognition using wireless signals", In Proceedings of the 19th annual international conference on Mobile computing & networking, pp. 27-38. ACM, 2013.

Seifeldin, et al., "A deterministic large-scale device-free passive localization system for wireless environments", Mobile Computing, IEEE Transactions on, 12(7):1321-1334, 2013.

Wang, et al., "No need to war-drive: unsupervised indoor localization", In Proceedings of the 10th international conference on Mobile systems, applications, and services, pp. 197-210. ACM, 2012.

Weppner, et al., "Bluetooth based collaborative crowd density estimation with mobile phones", In Pervasive Computing and Communications (PerCom), 2013 IEEE International Conference on, pp. 193-200. IEEE, 2013.

Wilson, et al., "See-through walls: Motion tracking using variance-based radio tomography networks", Mobile computing, IEEE Transactions on, 10(5):612-621, 2011.

Xi, et al., "Electronic frog eye: Counting crowd using will".

Xu, et al., "SCPL: Indoor device-free multi-subject counting and localization using radio signal strength", In Proceedings of the 12th international conference on Information Processing in Sensor Networks, pp. 79-90. ACM, 2013.

Yuan, et al., "Crowd density estimation using wireless sensor networks", In Mobile Ad-hoc and Sensor Networks (MSN), 2011 Seventh International Conference on, pp. 138-145. IEEE, 2011.

Zhang, et al., "Cocktail: an RF-based hybrid approach for indoor localization", In Communications (ICC), 2010 IEEE International Conference on, pp. 1-5. IEEE, 2010.

* cited by examiner

SYSTEM AND METHOD OF OCCUPANCY ESTIMATION UTILIZING TRANSMITTED SIGNALS

CROSS-REFERENCE TO RELATED APPLICATIONS

This application is a continuation of U.S. application Ser. No. 15/087,554, filed on Mar. 31, 2016, which claims priority to U.S. Provisional Application No. 62/140,847, filed on Mar. 31, 2015, and entitled "OCCUPANCY ESTIMATION USING RF OR WIFI SIGNALS," the disclosure of which is incorporated by reference in its entirety.

STATEMENT OF GOVERNMENT RIGHTS

This invention was made with Government support under Grant (or Contract) No. 0846483 awarded by the National Science Foundation. The Government has certain rights in this invention.

TECHNICAL FIELD

The present disclosure is related generally to a system and method of occupancy estimation and monitoring.

BACKGROUND

Occupancy estimation within a particular region is useful in a variety of applications. For example, information regarding occupancy of a building or region within a building can be used to improve the efficiency, comfort, and convenience of the building for occupants, for example by turning on lights or activating heating/cooling systems. Occupancy estimation within a building may also be utilized to direct first responders in the event of an emergency such as a fire. In other applications, occupancy information can be utilized by Wi-Fi service providers to optimize performance in a given region (indoor or outdoor). More generically, occupancy estimation can be utilized to estimate the number of customers in a store or visitors to attraction, plan resources in a smart city.

A variety of occupancy estimation systems have been developed over the years. Examples of such systems include video monitoring/analytics systems, radio-frequency identification (RFID) systems, as well as others. However, each of these systems suffers from one or more drawbacks. For example, video monitoring/analytics systems require a considerable amount of additional equipment, including video camera and large amounts of memory for storing the video data to be analyzed. In addition, video analytic systems suffer from notoriously poor performance in low-light conditions. Most importantly, they do not preserve privacy and do not have the potential of counting behind walls. Other systems, such as RFID systems rely on occupants carrying an RFID tag/card that can be sensed by the RFID system to monitor occupants. However, this system requires distribution of RFID card to occupants, which is not feasible in many applications.

It would therefore be desirable to develop a system and method that is able to monitor occupancy in a variety of different applications, without relying on people to carry any device, while preserving privacy, and with see-through capability.

DETAILED DESCRIPTION

The present disclosure provides a system and method of estimating occupancy in a monitored region based on monitored signals such as radio-frequency (RF) signals or WiFi signals. In one embodiment, the system includes at least one transmitter unit and at least one receiver unit located in the region to be monitored. The transmitter unit broadcasts a signal that is received by the receiver unit. The receiver unit measures one or more attributes of the received signal, and estimates the number of occupants in the region based on the one or more measured attributes. Benefits of the system include the ability to take advantage of hardware (e.g., WiFi routers/transceivers) already installed in many locations, and because the system passively monitors signal broadcasts in the monitored region it does not require (does not rely on) the occupants to carry any device.

Figure 1:
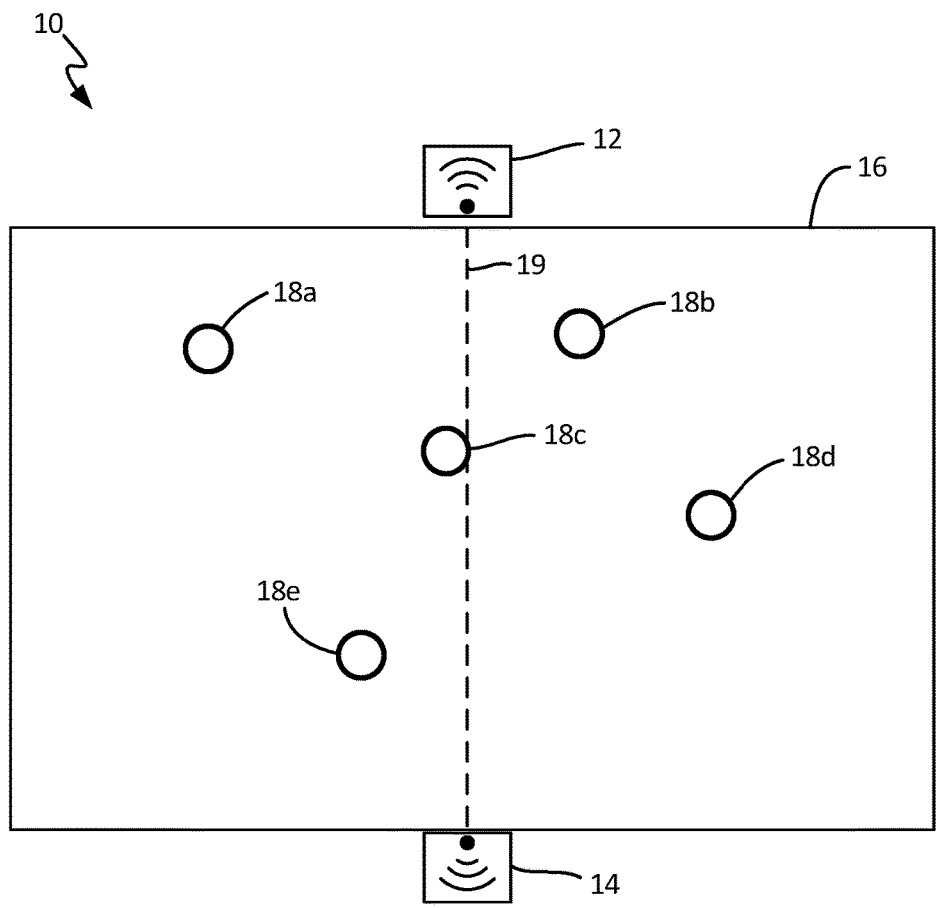
FIG. 1 is a schematic illustrating a layout of an occupancy estimation system according to an embodiment of the present invention.

FIG. 1 is a schematic illustrating a layout of occupancy estimation system 10 according to an embodiment of the present invention, which includes receiver unit 12 and transmitter unit 14 positioned on opposite sides of the border surrounding monitored region 16. In other embodiments, transmitter unit 14 and receiver unit 12 may be located at various locations around and/or within the monitored region 16. In one embodiment, receiver unit 12 and transmitter unit 14 are both capable of transmitting and receiving transmission signals (i.e., transceiver units). In other embodiments, receiver unit 12 serves only as a receiving station and transmitter unit 14 serves only as a transmitting station. In general, transmitter unit 14 generates a signal that is received by receiver unit 12. The presence of occupants 18 located within region 16 impacts the received signal and this impact can be detected in the received signal and utilized to estimate the number of occupants 18 located within monitored region 16. In particular, occupants impact the signal via two mechanisms. The first mechanism is referred to as line-of-sight (LOS) blocking, and occurs when an occupant crosses the link between the receiver unit 12 and the transmitter unit 14, or is located directly (or close enough) between the receiver unit 12 and the transmitter unit 14 (i.e., along the so-called line-of-sight path between the receiver and the transmitter). Similarly, LOS blockage also describes multiple simultaneous occupant crossings or multiple occupants located on the LOS path. For example, in the embodiment shown in FIG. 1, occupant 18c is located along (or close enough) to LOS path 19 and would therefore cause LOS blocking of the signal. LOS blocking causes a measurable decrease in the amplitude or strength of the signal received by receiver unit 12 for the duration of time the occupant remains in a blocking position. The second mechanism by which occupants impact the signal is as a result of multi-path (MP) scattering/fading. This mechanism does not require occupants to be located along LOS path 19. Although MP scattering may not decrease the amplitude/signal strength as dramatically as LOS blocking, MP scattering results in a decrease in amplitude/signal strength that is related to the number of occupants located in the monitored region 16.

In this way, monitoring of one or more attributes, such as signal strength, are utilized to detect these sources of impact and estimate the number of occupants located within monitored region 16. For example, several measured decreases in a monitored attribute such as signal strength may be interpreted as indicating the presence of occupants crossing the LOS path 19, thereby interfering with the signal via LOS blocking. Based on the size of the monitored region 16, and mathematical and/or probabilistic analysis related to LOS such as estimates of how likely an occupant is to cross or be located on the LOS path, LOS analysis can be utilized to estimate the total number of occupants within monitored region 16. Mathematical and/or probabilistic analysis of MP scattering/fading effects can also reveal information about number of occupants. Embodiments may utilize LOS analysis, MP scattering/fading analysis, or a combination of LOS and MP scattering/fading analysis to detect information regarding occupants located in the monitored region 16.

In one embodiment, relative received signal strength in a wireless environment (RSSI)—which is a function of the power level received by a receiver—is an example of an attribute that may be utilized to estimate occupancy. A benefit of utilizing RSSI is that many WiFi devices already measure RSSI and therefore this attribute may be made readily available for subsequent analysis to estimate number of occupants. In other embodiments, other signal attributes may be utilized such as signal-to-noise ratio (SNR), received channel power indicator (RCN), phase of the signal, power and phase, or other attributes of signal strength.

Throughout the disclosure, reference is made to the signal utilized as being a WiFi signal or radio frequency (RF) signal. Benefits of utilizing WiFi or RF signals is the ability to take advantage of hardware infrastructure already in place. For example, if utilizing WiFi, the present invention may utilize commercially available WiFi routers or cards. In some cases, a region to be monitored—such as an office—may already have WiFi wireless routers installed that can be configured to estimate occupancy based on measured signal attributes. However, it should be understood that in other embodiments, other types of transmission signals may be utilized operating at other frequencies (e.g., radio frequency (RF) range).

Although in the embodiment shown in FIG. 1, only one pair of transmitting/receiving units is shown, in other embodiments a region may utilize a plurality of transmitting/receiving units. By locating the transmitting/receiving pairs at different locations around the perimeter of monitored region 16, a plurality of links are created, allowing additional information to be retrieved from the monitored region 16. In one embodiment, each transmitting/receiving pair operates at a different frequency to independently estimate the number of occupants in the region. The occupant estimate created by each transmitting/receiving pair may be averaged or statistically aggregated to generate an occupancy estimate. In other embodiments, the transmitting/receiving pairs each operate at the same frequency, wherein analysis is made on the aggregated signal received at each receiver. In another embodiment, a link can scan different frequencies or use a large bandwidth. In other embodiments, a link can do multiple transmissions at different frequencies using OFDM type transmissions, or other specialized transmissions.

Figure 2:
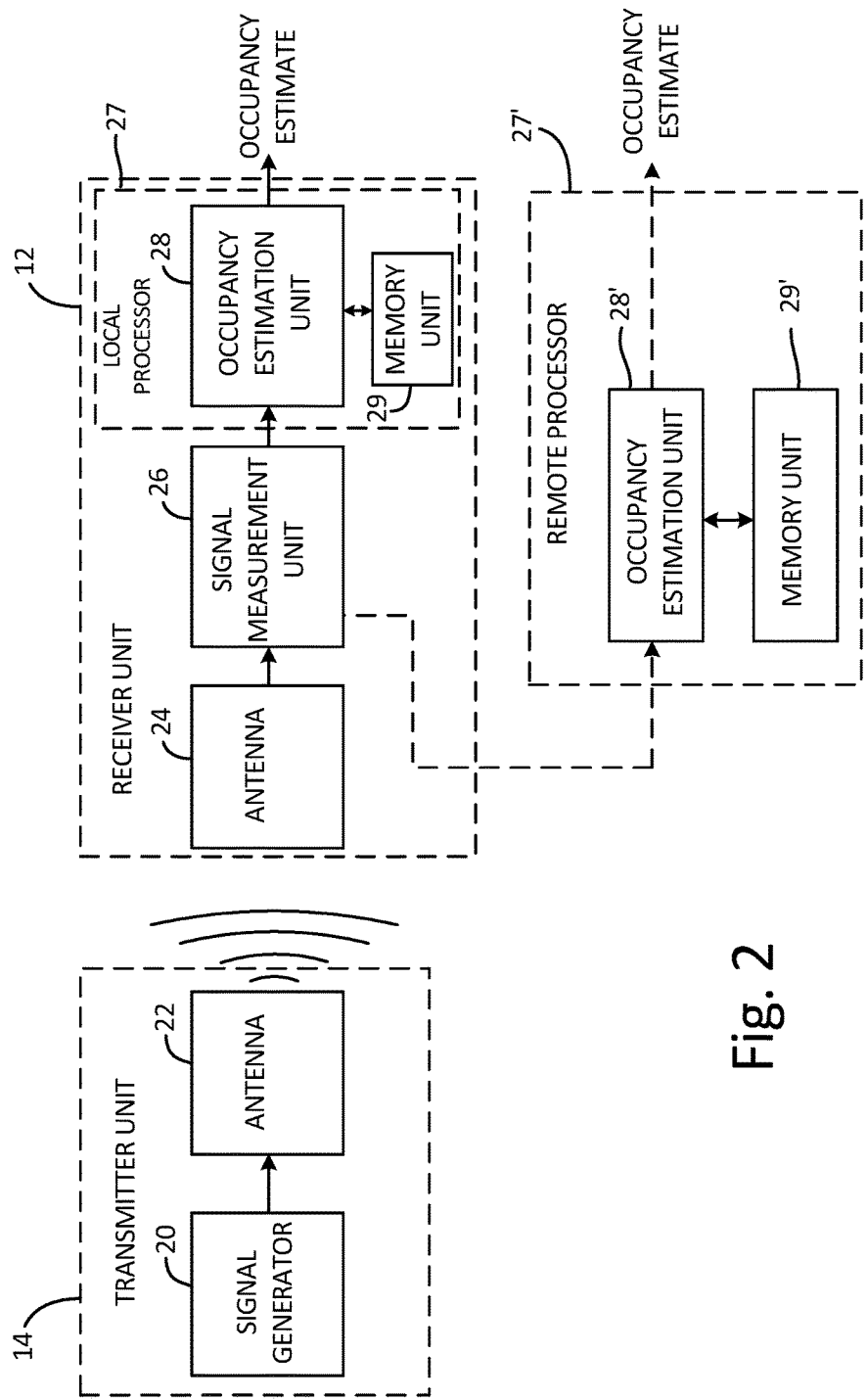
FIG. 2 is a schematic block diagram that illustrates occupancy estimation system according to an embodiment of the present invention.

FIG. 2 is a schematic block diagram that illustrates occupancy estimation system 10 according to an embodiment of the present invention. In particular, occupancy estimation system 10 includes receiver unit 12 and transmitter unit 14. In the embodiment shown in FIG. 2, transmitter unit 14 includes signal generator 20 and antenna 22. Receiving unit 12 includes antenna 24, signal measurement unit 26, memory unit 27 and occupancy estimation unit 28.

With respect to transmitting unit 14, signal generator 20 generates the transmission signal. As discussed above, the signal may be a WiFi signal, a RF signal, or other wireless signals. Antenna 22 transmits the generated signal. In one embodiment, antenna 22 is a directional antenna that is oriented in the direction of receiver unit 12. In another embodiment, antenna 22 is an omni-directional antenna that transmits the generated signal in approximately all directions. In other embodiments, antenna 22 may utilize other known antenna patterns.

With respect to receiving unit 12, antenna 24 receives the transmission signal and provides the received signal to signal measurement unit 26. In one embodiment, signal measurement unit 26 measures one or more attributes associated with the received signal, such as RSSI, SNR, phase, or RCPI. The one or more attributes measured by signal measurement unit 26 are stored to memory unit 27, or provided directly to occupancy estimation unit 28. In one embodiment, an occupancy estimate stores a duration of measured signal attributes (e.g., 50-300 seconds), which are then made available to occupancy estimation unit 28 for analysis. Based on the measured/stored signal attributes, occupancy estimation unit 28 estimates a number of occupants located within the region between transmitting unit 14 and receiving unit 12. The occupancy estimate may be utilized internally by occupancy estimation system 10, or may be communicated externally to other systems.

In the embodiment shown in FIG. 2, occupancy estimation unit 28 is implemented by local processor 30. However, in other embodiments the functions performed by occupancy estimation unit 28 may be implemented external to receiving unit 12. For example, the measured/stored signal attributes may alternatively be communicated to a remote device 31' (dashed outline) external to receiver unit 12 for analysis. In this embodiment, remote device 31 includes occupancy estimation unit 28' and memory unit 27'. In this embodiment, attributes measured by signal measurement unit 26 are communicated to remote device 31 for occupancy estimation analysis.

Figure 3:
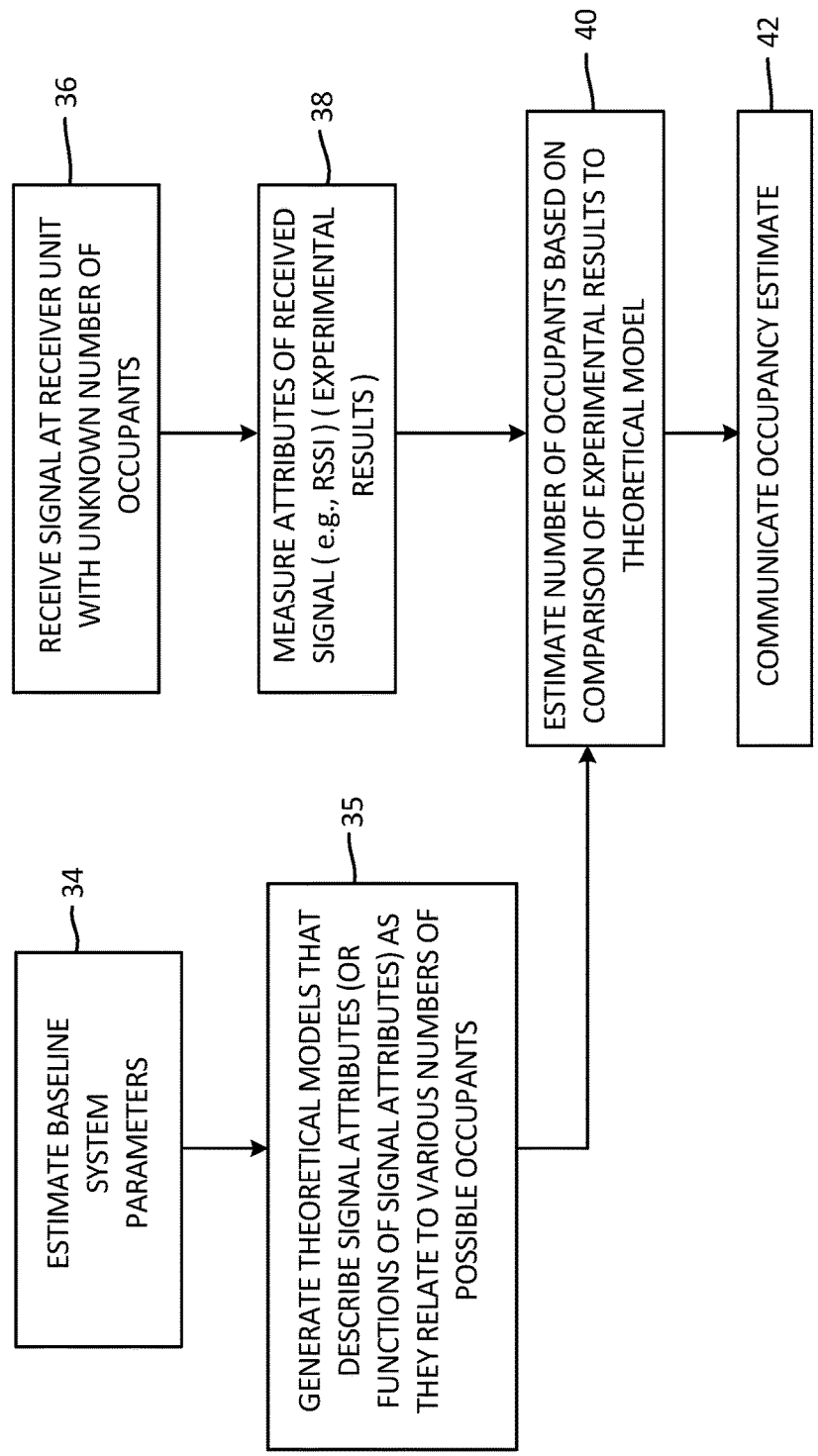
FIG. 3 is a flowchart that illustrates steps performed to estimate occupancy according to an embodiment of the present invention.

FIG. 3 is a flowchart that illustrates steps performed to estimate occupancy according to an embodiment of the present invention. As discussed above, occupancy estimations are generated based on one or more measured signal attributes. More particularly, in the embodiment shown in FIG. 3, occupancy estimates are generated by comparing a function of the one or more measured signal attributes to a theoretical model that represents the one or more signal attributes as a function of number of occupants in the monitored region. The occupancy estimate is generated based on finding the best fit between the function describing the one or more measured signal attributes and the theoretical model.

In the embodiment shown in FIG. 3, at step 34 baseline parameters are estimated and stored for subsequent use in estimating occupancy. It should be noted that in some embodiments, no baseline parameters are required and in these embodiments mathematical modeling of received signal attributes as a function of number of occupants—as described with respect to step 35—may constitute the first step in the process. However, in many embodiments it may be useful to generate baseline parameters, which can be stored in memory unit 27 and provided as an input to step 35. In addition to estimating baseline parameters, this step may also include inputting or otherwise receiving system parameters such as dimensions of the monitored region and type of antenna being utilized (e.g., directional versus omnidirectional). This information is stored (e.g., to memory 27) for subsequent use in analyzing measured attributes of the signal.

Baseline parameters may be generated in a number of ways, including simulation of baseline values, table lookup of baseline values, or measurement of signal attributes in an initialization state. For example, in one embodiment, baseline parameters may be estimated prior to the actual operation by measuring received signal attributes (e.g., relative received signal strength (RSSI)) when one or a number of occupants are within the monitored region. Depending on the mathematical models utilized at step 35, different baseline measurements may be collected at step 34. For example, in an embodiment in which the mathematical modeling provided at step 35 is based on LOS blocking, at step 34 various known numbers of occupants may be positioned on the LOS path and received signal attributes may be measured. In embodiments in which mathematical modeling at step 35 is based on multi-path scattering, one or more occupants may be asked to walk within the monitored region 16 and received signal attributes are measured. In yet another embodiment, a known number of occupants may be positioned in the monitored region 16 for a specified period of time and received signal attributes are measured. In this way, the types of baseline parameters simulated, generated, or measured at step 34 may be based on the type of modeling utilized at step 35, such as LOS blocking only, the effects of MP scattering only, or the combined effects of both LOS blocking and MP scattering. For example, in one embodiment, the attribute is measured when no occupants are in the area ($B_0$), when one occupant is on the LOS path ($B_1$), and when two occupants are on the LOS path ($B_2$), and when one occupant walks in the area. Additional measurements may be taken for a greater number of occupants located in the LOS path, or additionally for a known number of occupants located outside of the LOS path, or walking in the area.

In addition to measuring received signal attributes $B_k$ in response to a known number of occupants within the monitored region, in other embodiments the theoretical/baseline values can be derived mathematically, derived from simulation, and/or calculated from electromagnetic propagation tables without requiring prior measurements of the received signal attributes. In other embodiments, mathematical models may be utilized to estimate the impact of occupancy on the received signal attribute. Embodiments of the present invention may utilize measured baseline values based on prior measurements with known occupancy, theoretical baseline values based on signal propagation tables, simulated baseline values, estimated values, or a combination thereof.

At step 35, theoretical or mathematical models are generated that describe signal attributes (or a function of signal attributes, such as a probability density function or probability mass function) as they relate to various numbers of possible occupants. Theoretical models generated at step 35 may take into account one or more ways in which occupants impact the received signal. For example, modeling may include mathematical modeling of LOS blocking as a function of potential number of occupants, mathematical modeling of multi-path (MP) scattering/fading as a function of potential number of people, or a combination of both LOS/MP analysis. In one embodiment, mathematical modeling or LOS, MP or LOS/MP may involve deriving an expression for the probability density function (PDF), probability mass function (PMF), or other statistical or probabilistic function as they relate to various numbers of occupants. In other embodiments, mathematical analysis can involve other spatio-temporal analysis (mathematical analysis of multiple links over space and time) or other probabilistic spatio-temporal analysis (probabilisitic analysis of multiple links over space and time) of the measured signal attributes. In some embodiments, the analysis performed at step 35 may make use of modeling occupant behavior within the monitored region. In one embodiment, for instance, the speed or average speed of occupants may be assumed and used in the mathematical modeling. In another embodiment, any knowledge of spatial preferences or popular areas can be used in the mathematical modeling. Theoretical models generated at step 35 are stored, for example to memory unit 27 (shown in FIG. 1), and subsequently compared to measured signal attributes (or, functions describing the measured signal attributes) for occupancy estimation purposes.

At step 36, a signal is received by receiving unit 12 or by a number of receiving units, in transmission from one or multiple transmitters in the area. As discussed above, this may include WiFi signals, RF signals, or other types of transmission signals in which the presence of occupants will have a detectable impact on the received signal. At step 38, one or more attributes are measured with respect to the received. This may include RSSI, SNR, RCPI, phase, as well as other signal attributes related to received power, signal strength, signal phase, or signal delay. In one embodiment signal attributes are measured over a period of time (e.g., 10-300 seconds) to allow temporal analysis of the measured signal attributes. In other embodiments, measuring of signal attributes may include measuring a plurality of signal attributes associated with a plurality of transmitter/receiver units to allow spatial analysis of the measured signal attributes. In still other embodiments, a combination of temporal and/or spatial signal attributes may be measured and utilized in subsequent steps. In one embodiment, a probability density function or a probability mass function is used to express the measured signal attributes. In another embodiment, other functions of the measured signal attributes can be calculated. One example is inter-arrival time, which is the time it takes for the signal to visit back a certain level.

Figure 6:
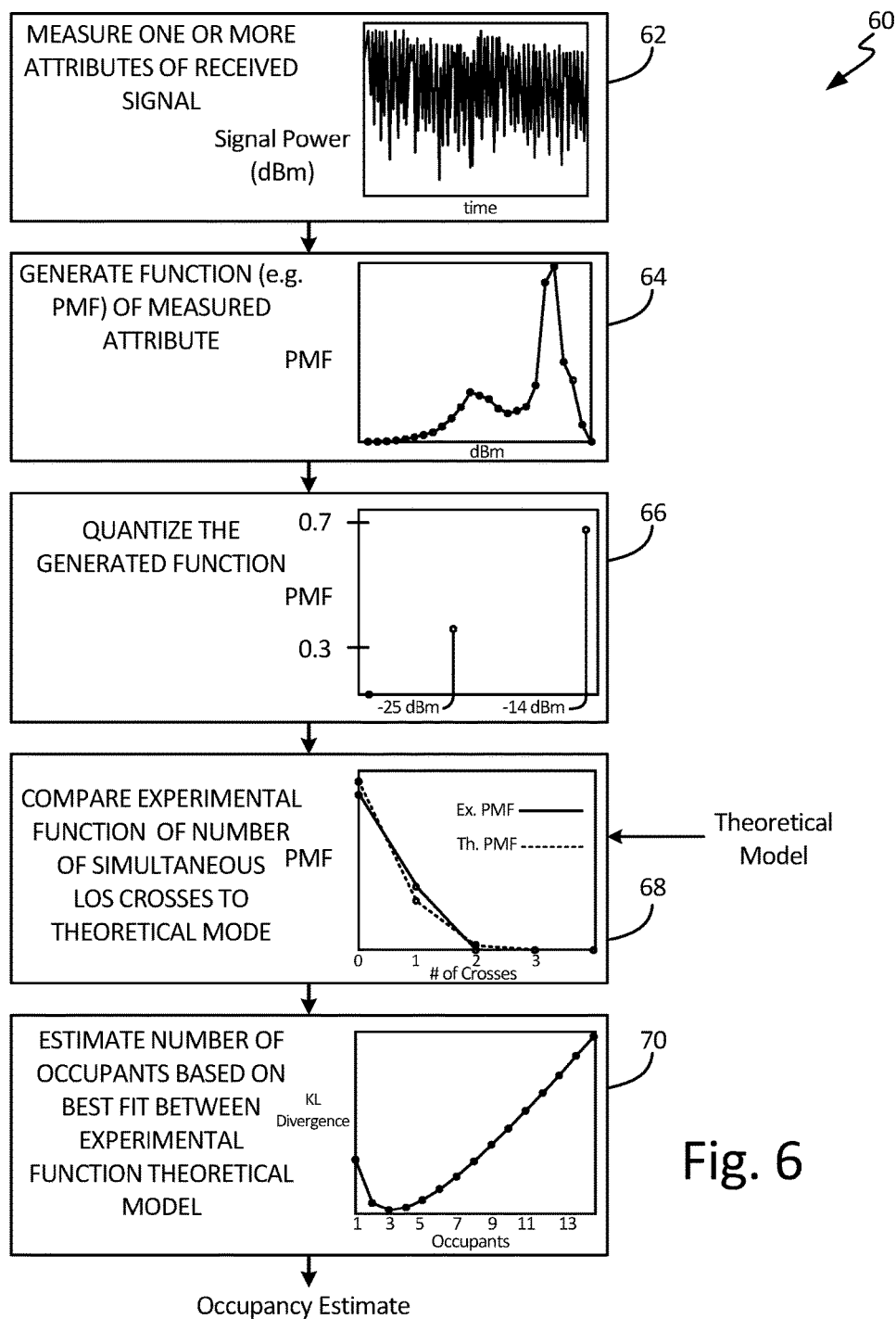
FIG. 6 is a flowchart that illustrates graphically the calculation of an occupancy estimate based on a measured signal attribute and line-of-sight (LOS) blocking modeling as a function of number of occupants according to an embodiment of the present invention.
Figure 10:
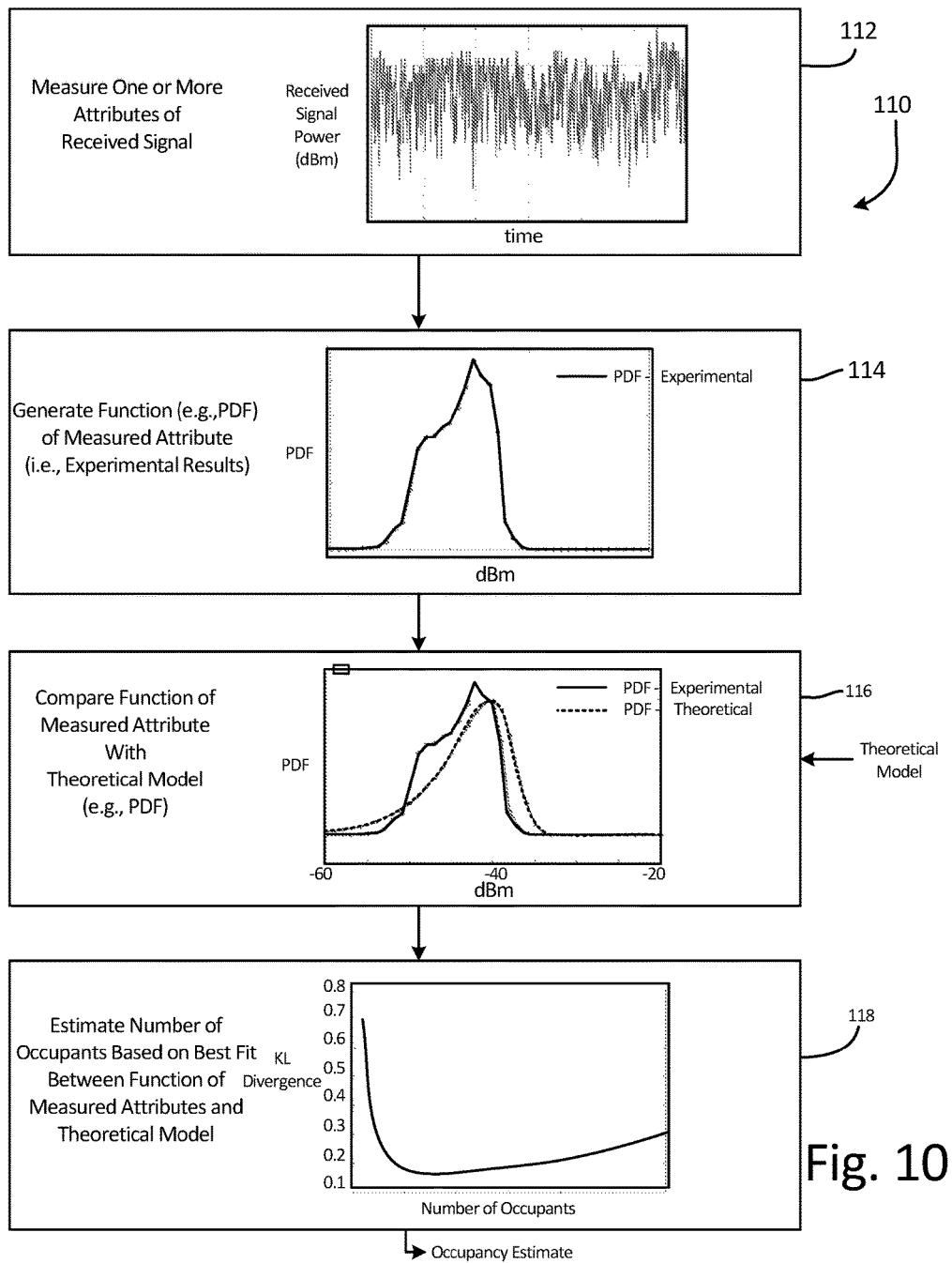
FIG. 10 is a flowchart that illustrates graphically the calculation of an occupancy estimate based on a measured signal attribute and combined line-of-sight (LOS) and multi-path scattering/fading modeling as a function of number of occupants according to an embodiment of the present invention.
Figure 11:
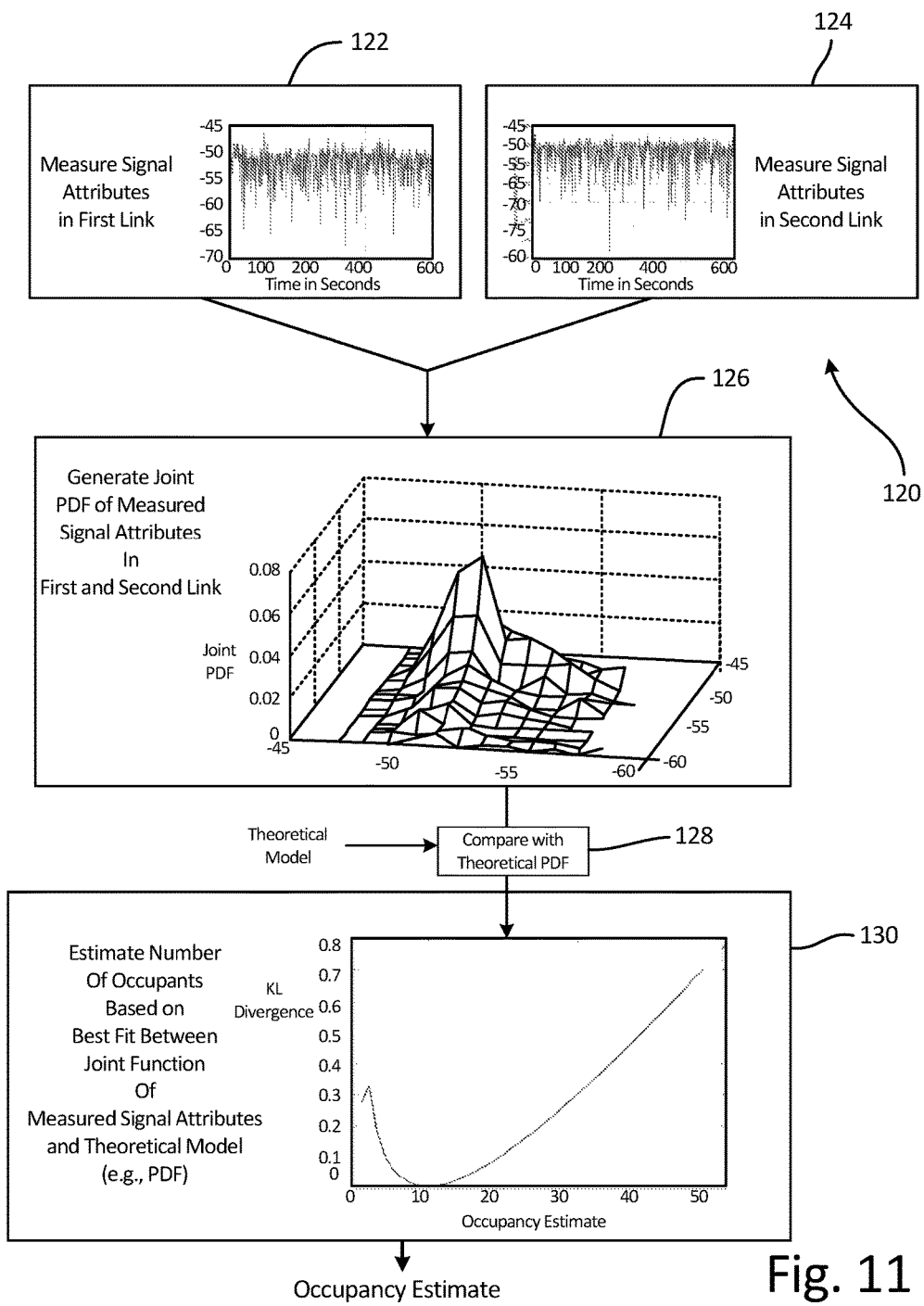
FIG. 11 is a flowchart that illustrates graphically the calculation of an occupancy estimate based on a first measured signal attribute of one link and second measured signal attribute of another link according to an embodiment of the present invention.

At step 40, occupancy is estimated based on a comparison of signal attributes measured at step 38 with the mathematical models (i.e., theoretical models) generated at step 35. More particularly, in one embodiment the signal attributes measured at step 38 are analyzed to derive a probability density function (PDF) or probability mass function (PMF) representation of the measured attributes that can be compared with the statistical or probabilistic functions derived for the theoretical models as described above. Examples of functions utilized to represent the measured attributes are shown in FIGS. 6, 10 and 11, respectively. The number of occupants can be estimated at step 40 by finding the best match between the PDF/PMF representation of the measured signal attributes and the theoretical or modeled attributes (or functions of the modeled attributes) calculated at step 35. A variety of methods may be utilized to find the best match or fit between the function describing the experimental (measured) attributes and the function describing the theoretical (modeled) attributes, such as Kullback-Leibler (KL) divergence.

At step 42, the occupancy estimate generated at step 40 is communicated. In one embodiment, the occupancy estimate is communicated locally, allowing (for example) a wireless router or station to be optimized based on the number of estimated occupants. In other embodiments, the occupancy estimate is communicated externally to other nodes or other systems, such as building HVAC systems, environmental systems, security systems, wireless service provider systems, emergency responder systems or any other system that may benefit from knowledge regarding the number of occupants estimated to be located in a particular region.

Figure 4:
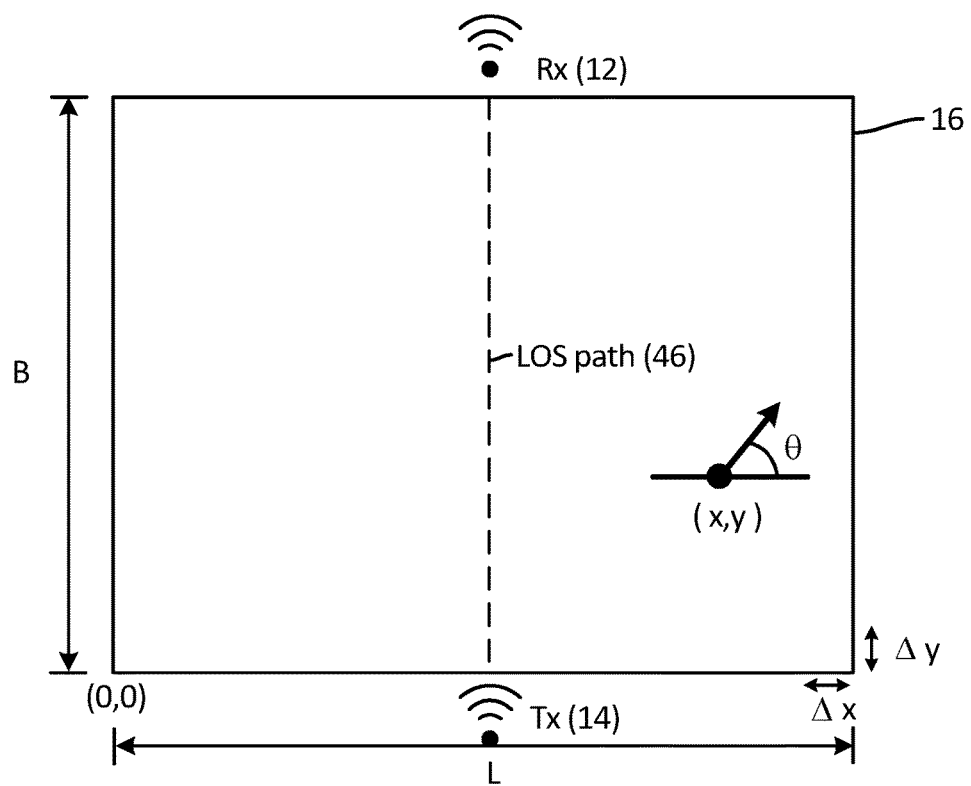
FIG. 4 is a schematic diagram of a sample monitored region according to an embodiment of the present invention.

FIG. 4 is a schematic diagram of a sample monitored region. FIG. 4 is utilized herein to describe how occupant motion or behavior can be additionally modelled and used as part of LOS part in some embodiments. It should be understood that a plurality of modeling methods may be utilized to model the behavior or motion of occupants within a region from assuming occupant speed(s) to assuming spatial preferences, to a Markov chain modeling. Further, occupancy can be estimated without any modeling of motion or behavior. The modeling method described with respect to FIG. 4 provides a simple probabilistic motion model. This modeling is utilized for instance to determine the probability of an occupant in the monitored region crossing the LOS path, which can be used in LOS modeling.

With respect to FIG. 4, the monitored region is modeled as a rectangular region having dimensions L×B. The region is discretized to form a 2-D discrete workspace W that consists of a plurality of cells, wherein the position of each cell is specified by the coordinates at its center. The lower left corner is identified as location (0,0), the length of the modeled region is identified as L and the breadth of the modeled region is identified as B. The dimension of a cell can be described as $\Delta x$, $\Delta y$, with $\Delta x = L/N_{div,x}$ and $\Delta y = B/N_{div,y}$. In the model shown in FIG. 4, transmitter unit 14 and receiver unit 12 are located at the coordinates (L/2, 0) and (L/2, B) respectively. The line-of-sight (LOS) path is illustrated by dashed line 46, which is located directly between transmitter unit 14 and receiver unit 12. As described in more detail below, an occupant that crosses the LOS path 46 temporarily blocks (at least partially) the received signal. This LOS blockage can be detected in one or more measured attributes of the received signal. The embodiment shown in FIG. 4 provides the framework for the motion model provided below.

A variety of occupant motion models may be utilized to handle all occupants move in and out of the monitored region For example, in one embodiment, the motion model assumes that each occupant moves within the monitored region independent of other occupants, and at a speed of $d_{step}$ per iteration. In each iteration, the occupant chooses a direction $\theta$ (measured with respect to the x axis as shown in FIG. 4 and moves a distance of $d_{step}$ in that direction. A boundary condition may assume an occupant that interacts with the boundary reflects off the boundary and lands back within the workspace, with the total distance travelled still equal to $d_{step}$. The angle space $[0, 2\pi)$ is discretized into $\vartheta = \{0, \Delta\theta, \ldots, (N_{div,\theta}-1)\Delta\theta\}$ with $\Delta\theta = 2\pi/N_{div,\theta}$. In this embodiment, at each iteration it is assumed that each occupant maintains the same heading of the previous iteration (i.e., same angle $\theta$), with the probability $p_\theta < 1$, and selects an angle uniformly from $\vartheta$ with the probability $1-p_\theta$. The motion of occupant i can then be characterized by equations (1), (2), and (3) provided in U.S. Provisional Patent Application No. 62/140,847, incorporated herein by reference in its entirety. The final model becomes independent of $p_\theta$ or boundary behavior in this embodiment.

Figure 5:
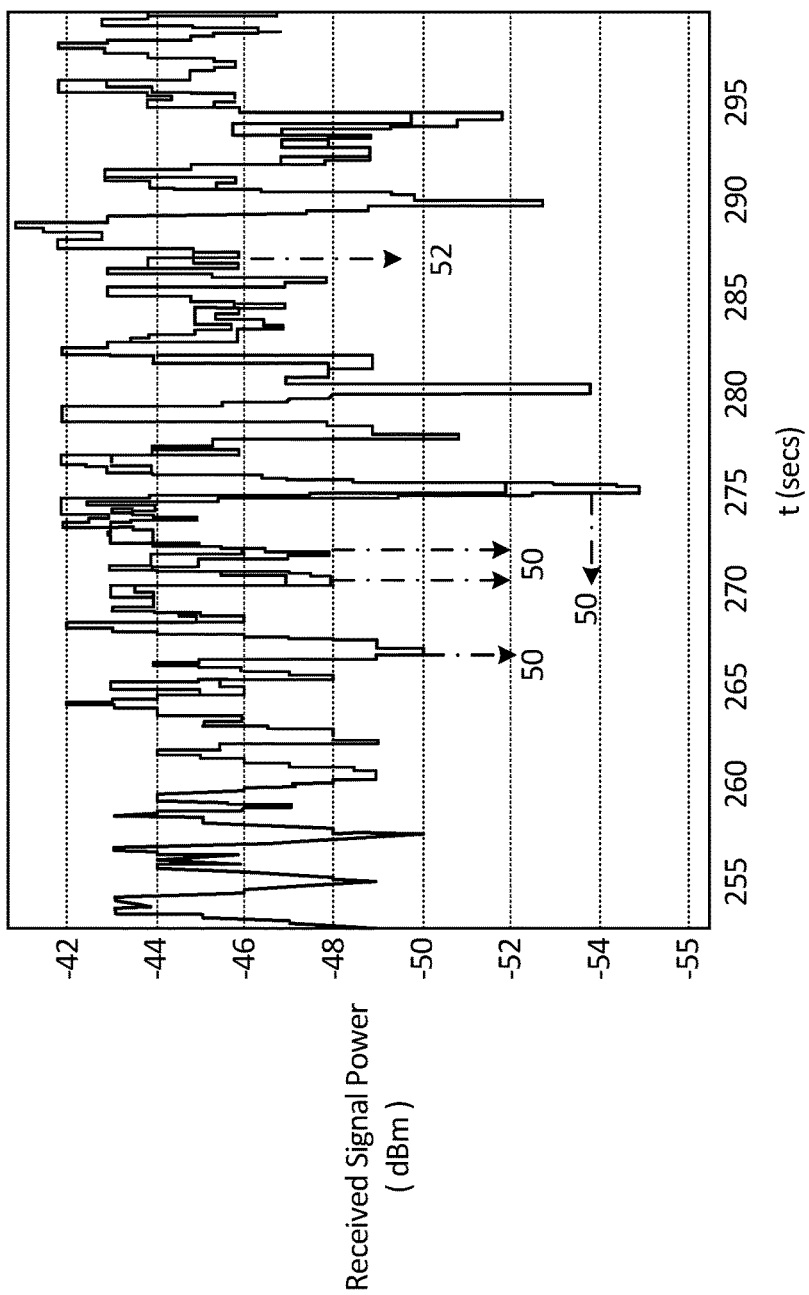
FIG. 5 is a chart illustrating received signal power measured by a receiving unit according to an embodiment of the present invention.

FIG. 5 is a chart illustrating received signal power measured by receiving unit 12 (as shown in FIG. 1). In the embodiment shown in FIG. 5, received signal power is illustrated along the y-axis and is measured in decibels (dBm), and is measured for period of time illustrated along the x-axis measured in seconds (secs). In the embodiment shown in FIG. 5, a time period of approximately 30 seconds is illustrated, although in other embodiments this time period may be modified. The embodiment shown in FIG. 5 was sampled from a monitored region that included five occupants (N=5).

As discussed above, an occupant affects the received signal (RF, WiFi, etc.) in two ways. In the first, an occupant that crosses directly between the transmitting unit 14 and the receiving unit 12 will cause a line-of-sight (LOS) blockage that will result in a sudden decrease of the received signal power. Examples of LOS blockage (by one or multiple simultaneous crosses) are labeled '50' in FIG. 5. That is, in response to an occupant crossing LOS path 46 (shown in FIG. 4A), the impact resulting from the occupant blocking the line-of-sight (LOS) path 46 between the transmitting unit 14 and receiving unit 12 causes a relatively large/sudden decrease in a measured attribute of the received signal (e.g., signal strength). In addition to occupants affecting the received signal in response to crossing the LOS path 46, occupants also scatter the received signal even when not directly crossing the LOS path, which contributes to multipath (MP) fading of the received signal. Examples of MP fading are labeled '52' in FIG. 5, and are characterized by variations in the received signal power. As compared to LOS blockages, the variations in signal amplitude/power as a result of MP scattering/fading can be less dramatic, depending on the scenario.

In general, for lower levels of occupancy, the LOS blocking effect typically results in more pronounced decreases in the monitored attribute (e.g., received power) of the received signal as compared to the MP fading effect. However, as the number of occupants increases, the MP fading effect may result in similar fluctuations in the monitored attribute (e.g., received power) of the received signal as compared to the LOS blocking effect. Although both LOS blocking and MP fading are described herein, embodiments of the present invention may operate by taking into account one or more of these sources (i.e., only LOS blocking, only MP fading, or both LOS blocking and MP fading).

Both LOS blocking and MP fading are typical propagation phenomena. However, mathematical models need to be developed to interpret them in the context of occupancy estimation. That is, the mathematical models developed describe the one or more signal attributes as a function of the number of occupants in the monitored region. The development of these models was described above with respect to FIG. 3 at step 35, which described various ways of creating the models (measuring based on known occupants, simulation, propagation tables, etc.) and as a function of different propagation phenomenon (i.e., LOS blocking, MP scattering/fading). For example, detection of a LOS blocking event—which indicates that an occupant has crossed the LOS path—informs us that at least one occupant is located within the monitored region. Detection of a second LOS blocking event, however, can indicate that either another occupant has crossed the LOS path or the same occupant has crossed again. In order to utilize detected LOS blocking events, the present invention must be able to characterize probability of simultaneous crosses. As the number of occupants located within the monitored region increases, the probability of simultaneous crossing events increases. If a combination of MP and LOS are utilized, in one embodiment, the present invention must be able to automatically model the combination effect instead of separating which dip is due to LOS and which part is due to MP. If a combination of MP and LOS are utilized, in another embodiment, dips can be categorized into LOS and MP ones.

In one embodiment, an asymptotic probability of an occupant crossing the LOS path is characterized as:

$$p_{cross} = \frac{2 * d_{step}}{\pi * L} \qquad \text{Eq. 1}$$

where $d_{step}$ represents the distance an occupant is estimated to travel within a given interval of time, and L is the length of the monitored region with the receiving unit and transmitting unit located at L/2, respectively. In this embodiment, $p_{cross}$ is a linear function of $d_{step}$ (i.e., the faster an occupant walks, the greater the chance the occupant crosses the LOS path).

In addition, because N occupants may be located within the monitored region, it is possible that more than one occupant crosses the LOS path at the same time (i.e., simultaneous crossings). The probability of simultaneous crossings can be expressed as:

$$p_{K,N}(k) = Pr(k \text{ simultaneous cross}) \qquad \text{Eq. 2}$$
$$= \binom{N}{k} p_{cross}^k (1 - p_{cross})^{N-k},$$

wherein $p_{K,N}$ denotes the probability mass function of random variable K denoting the number of simultaneous crosses with N occupants in the monitored region, and $p_{cross}$ as defined with respect to Eq. 1. The probability $p_{cross}$ of an occupant crossing the LOS path is independent of the number of occupants. However, the probability of simultaneous crosses increases as the number of occupants N increases. In the embodiments described with respect to Eq. 1 and 2, it is assumed all occupants maintain a constant speed $d_{step}$, although in other embodiments the analysis can be extended to include the case of an occupant moving with a variable or random speed, with the term $d_{step}$ denoting an average speed of occupants, rather than a constant speed. In other embodiments, occupants can move with different average speeds. In other embodiments, we can assume no specific speed or average speed and estimate speed(s) of occupants over the space as part of the unknowns (in addition to solving for the total number of people).

Based on LOS blocking and MP fading effects, an expression can be derived that describes the probability density function (PDF) of the monitored signal attribute (e.g., signal strength) as a function of number of occupants N. In one embodiment, the baseband equivalent received signal is described as follows:

$$A = \underbrace{b_0 e^{j\psi_0}}_{LOS} + \underbrace{\sum_{j=1}^{M} b_j e^{j\psi_j}}_{MP \text{ due to static objects}} + \underbrace{\sum_{i=1}^{N} a_i e^{j\phi_i}}_{MP \text{ due to walking people}} \qquad \text{Eq. 3}$$

$$= a_0 e^{j\phi_0} + \sum_{i=1}^{N} a_i e^{j\phi_i}$$

$$= A_{LOS,ST} + A_{MP},$$

wherein the term $b_0 e^{j\psi_0}$ represents the impact of LOS crossings on the received signal, the term $\sum_{j=1}^{M} b_j e^{j\psi_j}$ represents the multipath (MP) scattering effect due to static objects, and the term $\sum_{i=1}^{N} a_i e^{j\phi_i}$ represents the multipath (MP) scattering effect due to occupants. In particular, the terms $b_0$ and $\psi_0$ are the amplitude and phase of the LOS path respectively, $a_i$ and $\phi_i$ are the amplitude and phase of the path resulting from scattering off of the $i^{th}$ occupant, respectively, and $b_j$ and $\psi_j$, for j≠0, are the amplitude and phase of the path resulting from scattering off of the $j^{th}$ static object respectively. The term $\sum_{j=1}^{M} b_j e^{j\psi_j}$ denotes the impact of other static objects on the received signal, with M representing the total number of such static objects. Let $A_{LOS,ST} \triangleq b_0 e^{j\psi_0} + \sum_{j=1}^{M} b_j e^{j\psi_j} = a_0 e^{j\phi_i}$ denote the summation of the LOS component and MP due to the static objects. Furthermore, let $A_{MP} \triangleq \sum_{i=1}^{N} a_i e^{j\phi_i}$ represents the MP component due to occupants in motion. The phase of each path, $\phi_i$ for i=1, 2 . . . N, and $\psi_j$, for j=0, 1, 2 . . . M, is assumed to be uniformly distributed in [0 2π]. In addition, $\phi_i$ is assumed to be independent of $a_i$, and $\psi_j$, and $a_i$ is taken independent of $a_j$, for j≠i. In this way, Eq. 3 describes how LOS blockages and MP fading/scattering affects the received signal strength A.

The probability density function (PDF) of the received signal amplitude |A| is derived as illustrated in Equations (15)-(24) provided in U.S. Provisional Patent Application No. 62/140,847, incorporated herein by reference in its entirety. The resultant PDF signal is expressed as:

$$p_{|A|,N}(z) = z \int_{|U|=0}^{\infty} |U| J_0(|U|z)(E_{a_i}(J_0(a_i|U|)))^N E_{a_0}(J_0(a_0|U|)) d|U| \qquad \text{Eq. 4}$$

$$= z \int_{|U|=0}^{\infty} |U| J_0(|U|z) f(N) d|U|,$$

wherein $J_0$ is the zeroth-order Bessel function of the first kind, $E_a(.)$ represents the expectation with respect to a. The PDF $p_{|A|,N}(z)$ describes what the distribution of received signal amplitudes |A| would look like if there are N occupants in the monitored area. This distribution—essentially a prediction of what the distribution of signal strength would look like if N occupants are in the monitored region—is used in subsequent steps to determine a best fit of the monitored data. That is, this model of predicted signal strengths is compared to actual received distributions of signal strength, and the value of N that results in the predicted distribution of signal strengths most closely resembling the observed distribution of signal strengths is selected.

FIG. 6 illustrates visually a method 60 of estimating a number of occupants within a region based on a monitored attribute of the received signal (e.g., received signal power) and LOS modeling. In particular, the embodiment shown in FIG. 6 relies on probability mass functions to compare the measured signal attributes with a theoretical model that takes into account only LOS effects (i.e., utilizes only the LOS aspects of Equations 3 and 4).

At step 62, an attribute of the received signal is measured. In this embodiment, a total of three occupants are located in the monitored region during reception and measuring of a signal attribute associated with the received signal. In the embodiment shown in FIG. 6, the measured attribute is related to received signal power, which is one example based on a RSSI measurement. Similar to that shown with respect to FIG. 5, the measured attribute is monitored for a selected duration of time (e.g., approximately 300 seconds).

At step 64, a probability mass function (PMF) is calculated based on the measured attribute (i.e., received signal power). As illustrated in the graph associated with step 64, the PDF represents essentially how often the measured attribute was equal to a particular discrete value. In the example provided in step 64, the PMF includes a peak at a measured power of −14 dBm, and a secondary peak measured at a lower signal power level of −27 dBm. That is, most of the time the measured signal power is equal to the relatively higher signal power level of −14 dBm. However, the secondary peak at −27 dBm likely indicates degradation of the measured power due to interference by one or more occupants.

At step 66, the generated PMF is quantized (i.e., organized into bins). Although a plurality of methods may be utilized to quantize the PMF, in one embodiment the quantized bins are selected based on previously measured signal amplitudes $B_k$ having k occupants located along/blocking the LOS path. For example, the previously measured signal amplitudes $B_k$ may have been measured when initializing the system and may have been included as one of the measured baseline parameters. For example, a highest power bin (e.g., −14 dBm) may represent the previously measured signal amplitude (i.e., power) associated with $B_0$ (i.e., when no occupants are located along the path). The next bin (e.g., located at −25 dBm) may represent the measured signal amplitude associated with $B_1$ (i.e., when one occupant is located along the path), and the lowest power bin (e.g. −50 dBm) may represent the measured signal amplitude associated with $B_2$ (i.e., when two occupants are simultaneously located along the path). As a result, the PMF generated at step 64 is organized into the bins created at step 66. In the example shown in FIG. 6, the bin corresponding to the highest signal amplitude (e.g., −14 dBM) collects approximately 70% of the measured signal, while approximately 30% of the measured signals are associated with the medium signal amplitude bin (e.g., −25 dBm), and none of the measured signals are associated with the lowest signal amplitude bin. It should be understood, that in other embodiments quantizing the PMF does not require or rely on baseline parameters measured with a known number of occupants.

At step 68, the probability mass function of simultaneous crosses K is generated directly from the quantized PMF shown at step 66 (experimental PDF, represented by the solid line) and is compared with the mathematical or derived theoretical model (dashed line). In the embodiment shown at step 68, the theoretical model shown is the one best fits the shape of the measured/experimental results, although it should be understood that the quantized PMF will be compared to all theoretical models to find the one that provides the best fit. As shown in the example graph, the x-axis represents simultaneous crosses, while the y-axis is the probability (sum of which must be equal to one). In the example shown in FIG. 6, the bin associated with the received signal power of approximately −14 dBm (equal to 0.7 or 70% probability, as shown at step 66) does not correspond with a simultaneous cross, and so at step 68 the PMF of zero simultaneous cross is set equal to 0.7 or 70%. In contrast, the bin associated with the received signal power of approximately −25 dBm (as shown at step 66) corresponds with one simultaneous cross and is set equal to 0.3 or 30%.

In one embodiment, the theoretical results (dashed line) is based on a LOS model that utilizes the following for the probability density function of random $a_0$:

$$p_{a_0} = \sum_{k=0}^{N} \binom{N}{k} p_{cross}^k (1-p_{cross})^{N-k} \delta(a_0 - B_k), \quad \text{Eq. 5}$$

wherein $a_0$ is a random variable that can only take discrete values corresponding to the received signal strength when different numbers of occupants are located along the LOS path, and $B_k$ is the received signal amplitude when k occupants are located along the LOS path, and $\delta(.)$ is the Dirac delta function. In this way, the theoretical model provides a probability mass function (PMF) as a function of the number of occupants N, probability of crossing $p_{cross}$, $B_k$ values, and number of simultaneous crosses K. In particular, the theoretical results calculated and displayed at step 68 is for N=3 (i.e., three occupants), which as illustrated fits or agrees with the experimental results. The conclusion, based on the agreement or fit between the two lines is that the monitored region includes three occupants (N=3), which in the example provided is accurate.

At step 70, the estimated number of occupants $N_{est,dir}$ is selected such that it minimizes the difference between the experimental and theoretical PMFs, as provided by the following equation:

$$N_{est,dir} = \arg\min_{M} D_{KL}(p_{K,exp} \| p_{K,M}), \quad \text{Eq. 6}$$

wherein $D_{KL}(p_1 \| p_2)$ is the Kullback-Leibler (KL) divergence between the two distributions $p_1$ and $p_2$. As illustrated at step 70, the KL divergence is minimized at M=3, thereby indicating that theoretical curve $p_{k,3}$ shown at step 68 (estimating three occupants) is indeed the best fit for the experimental results. In this example, three occupants were located within the monitored region when the monitored attribute (i.e., signal power) was measured, resulting in an accurate estimation of number of occupants N in this case. In other embodiments, other metrics can be used to compare the two PMFs or in general find best estimate of number of occupants based on both measured attributes and derived models.

Figure 7A:
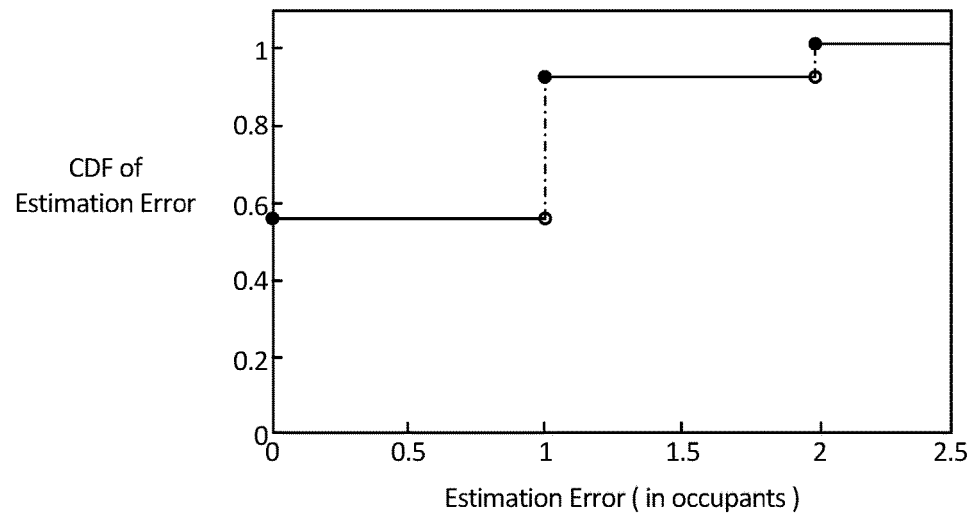
FIGS. 7A-7D are graphs that illustrate examples of error estimates for the case of both directional transceivers and omnidirectional transceivers, implemented in both outdoor and indoor environments according to embodiments of the present invention.
Figure 7B:
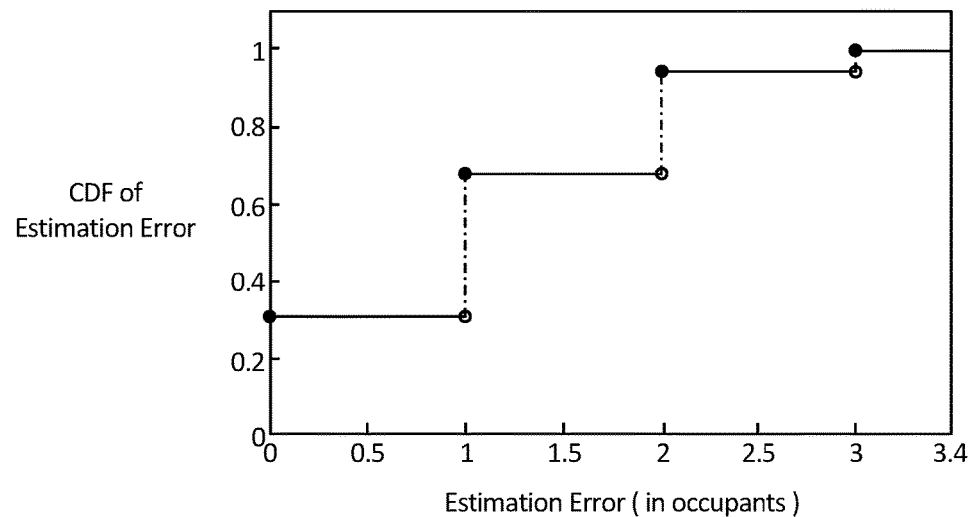
Figure 7C:
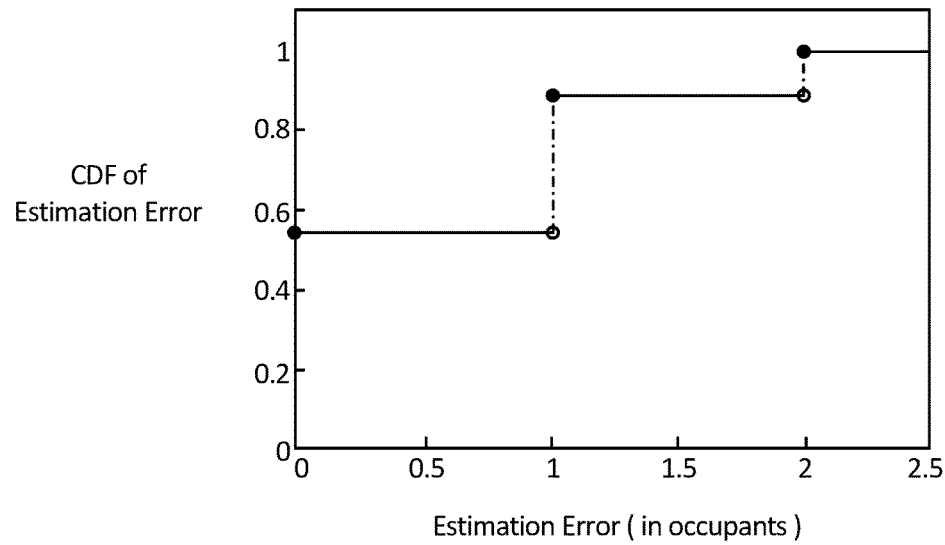
Figure 7D:
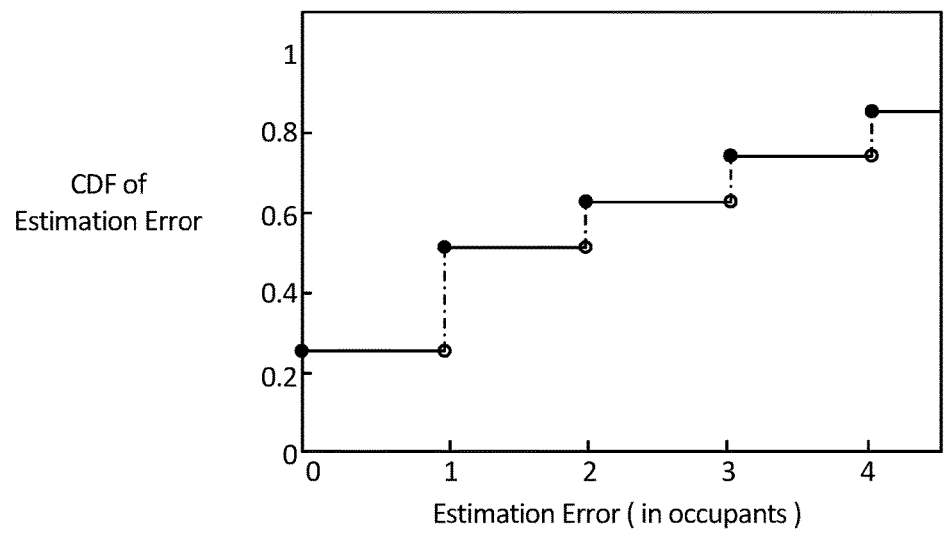

FIGS. 7A-7D are graphs that illustrate examples of error estimates for the case of both directional transceivers and omnidirectional transceiver, implemented in both outdoor and indoor environments according to embodiments of the present invention. In this embodiment, the theoretical model relies on LOS blocking to model signal attributes of a received signal as a function of various numbers of occupants. In particular, FIG. 7A illustrates the cumulative distribution function (CDF) of the estimation error for a plurality of test cases run utilizing directional transceivers/antennas in an outdoor location. FIG. 7B illustrates the CDF of the estimation error for a plurality of test runs utilizing an omnidirectional antenna in an outdoor location. FIG. 7C illustrates the CDF of the estimation error for a plurality of test runs utilizing directional transceivers/antennas in an indoor location, and FIG. 7D illustrates the CDF of the estimation error for a plurality of test runs utilizing omni-directional transceivers/antennas in an indoor location. The results shown in FIGS. 7A-7D are the result of experiments run in each of the plurality of settings with a number of occupants increasing from one to nine. Experiments having different number of occupants were run over a plurality of different days as well, in order to gather statistics for plotting the aforementioned CDF curves. It can be seen that, in the outdoor case, the estimation error is 2 person or less 100% of the time for directional case and 96% of the time for omnidirectional case. Similarly, FIGS. 7C and D show that the estimation error is 2 person or less 100% of the time for directional case and 63% of the time for omnidirectional case, in the indoor case.

Table 1 and 2 show sample results of a single run for the directional and omnidirectional cases respectively in the outdoor environment. Table 3 and 4 show sample results of a single run for the directional and omnidirectional cases respectively in the indoor environment. All tables show a good match.

TABLE 1

| DIRECTIONAL ANTENNA - OUTDOOR ENVIRONMENT | | | | | |
|---|---|---|---|---|---|
| NUMBER OF OCCUPANTS | 1 | 3 | 5 | 7 | 9 |
| ESTIMATED # OF OCCUPANTS | 1 | 3 | 4 | 7 | 8 |

TABLE 2

| OMNI-DIRECTIONAL ANTENNA - OUTDOOR ENVIRONMENT | | | | | |
|---|---|---|---|---|---|
| NUMBER OF OCCUPANTS | 1 | 3 | 5 | 7 | 9 |
| ESTIMATED # OF OCCUPANTS | 1 | 3 | 4 | 7 | 8 |

Results shown in FIGS. 7A and 7B (corresponding with Tables 1 and 2) illustrate that the directional antenna provides slightly better results, but that both omni-directional and directional transceivers may be utilized to accurately detect the number of occupants within an outdoor region.

With respect to the results shown in Table 3, below, and the CDF calculated as a result and shown in FIG. 7C, the results indicate that the number of occupants is correctly predicted approximately 55% of the time, will have an error of one or less occupant approximately 88% of the time, and will have an error of two or less occupants 100% of the time.

TABLE 3

| DIRECTIONAL ANTENNA - INDOOR ENVIRONMENT | | | | | |
|---|---|---|---|---|---|
| NUMBER OF OCCUPANTS | 1 | 3 | 5 | 7 | 9 |
| ESTIMATED # OF OCCUPANTS | 1 | 3 | 4 | 6 | 7 |

TABLE 4

| OMNI-DIRECTIONAL ANTENNA - INDOOR ENVIRONMENT | | | | | |
|---|---|---|---|---|---|
| NUMBER OF OCCUPANTS | 1 | 3 | 5 | 7 | 9 |
| ESTIMATED # OF OCCUPANTS | 2 | 3 | 8 | 10 | 11 |

Results shown in FIGS. 7C and 7D (corresponding with Tables 3 and 4) illustrate that the directional antenna provides slightly better results, but that both omni-directional and directional transceivers may be utilized to accurately detect the number of occupants within an indoor region.

In another embodiment, the theoretical model relies on only multi-path (MP) scattering/fading effects to models signal attributes of a received signal as a function of various numbers of occupants. Although no corresponding graph is provided to illustrate examples of error estimates over days, the following table illustrates the results achieved for one sample run. In particular, the occupancy estimates provided in the following table were obtained using a co-located transmitter unit and receiver unit (i.e., placed next to one another), and based on theoretical models relying only on MP scattering/fading effects.

| NUMBER OF OCCUPANTS | 1 | 3 | 5 |
|---|---|---|---|
| ESTIMATED # OF OCCUPANTS | 2 | 3 | 6 |

Figure 8A:
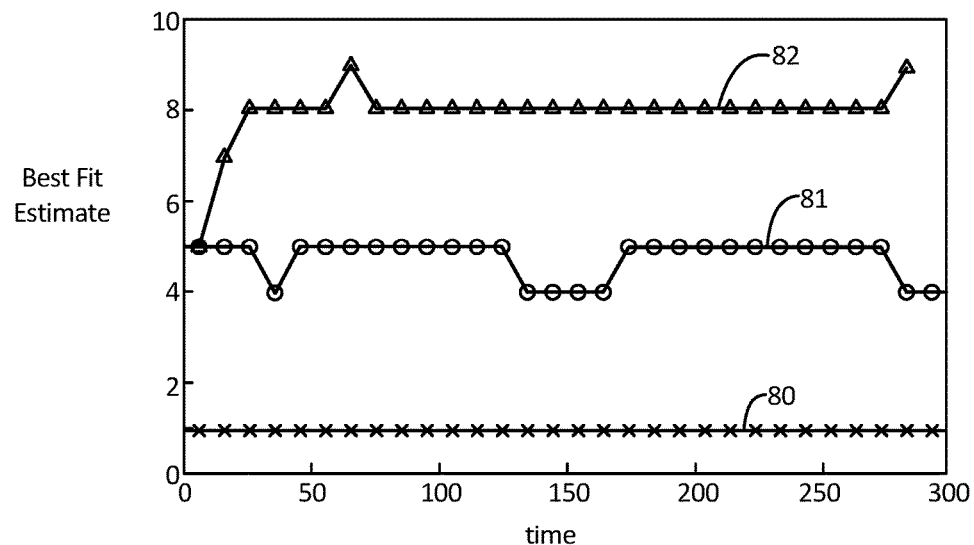
FIGS. 8A and 8B are sample occupancy estimations as a function of time for the case of a directional transmitter and an omnidirectional transmitter, respectively, according to an embodiment of the present invention.
Figure 8B:
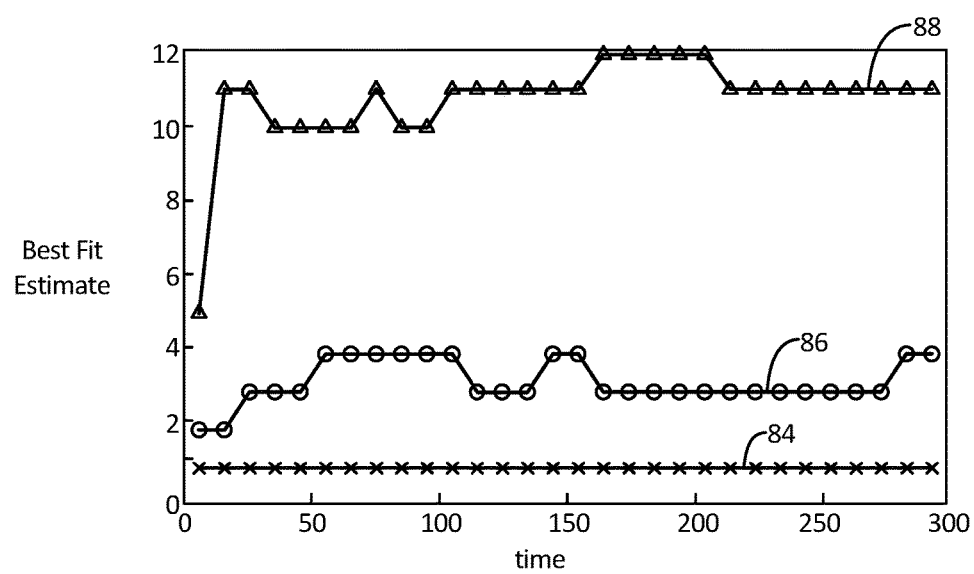

FIGS. 8A and 8B are sample occupancy estimations as a function of time for the case of a directional transmitter and an omnidirectional transmitter, respectively, according to an embodiment of the present invention. That is, FIGS. 8A and 8B illustrate how long it takes for occupancy estimates to settle to a steady-state value that is approximately equal to the actual value.

For example, with respect to FIG. 8A, three different test cases are illustrated. Line 80 represents the occupant estimate generated in the case in which a single occupant is located in the monitored region. Line 81 represents the occupant estimate generated in the case in which five occupants are located in the monitored region, and line 82 represents the occupant estimate generated in the case in which nine occupants are located in the monitored region. The embodiment shown in FIG. 8B provides similar results, even though the tests were conducted with omnidirectional antennas as opposed to a directional antennas. Line 84 represents the occupant estimate generated in the case in which a single occupant is located in the monitored region, line 86 represents estimates made in the case of five occupants located in the monitored region, and line 88 represents estimates made in the case of nine occupants located in the monitored region.

In the embodiment shown in FIGS. 8A and 8B therefore suggest that a shorter time duration (i.e., shorter than 300 seconds) may be utilized achieve similar performance in estimating occupants within a region. In some embodiments, time durations as short as 30 seconds may be sufficient to reach a steady state occupant estimate. However, it should be noted that the upper bound for the time required to reach a steady state value will depend on the size of the monitored area, the speed of occupants within the monitored area, and the total number of occupants. More occupants can increase the convergence rate up to a certain point.

FIGS. 9A-9E are graphs comparing theoretical PDF and experimental PDF for a plurality of different occupants (e.g., 1, 3, 5, 7 and 9), respectively according to an embodiment of the present invention. When the theoretical PDF that is a best fit for the experimental PDF utilizes a value of N equal to the number of occupants actually present in the monitored region, this indicates a good match between the theoretical PDF and the experimental PDF, as the correct number of occupants is estimated as result of the match. FIG. 9A-9E, in general, demonstrate that the experimental and theoretical PDFs match each other well. Experimental PDFs were measured using omni-directional antennas, according to an embodiment of the present invention.

Figure 9A:
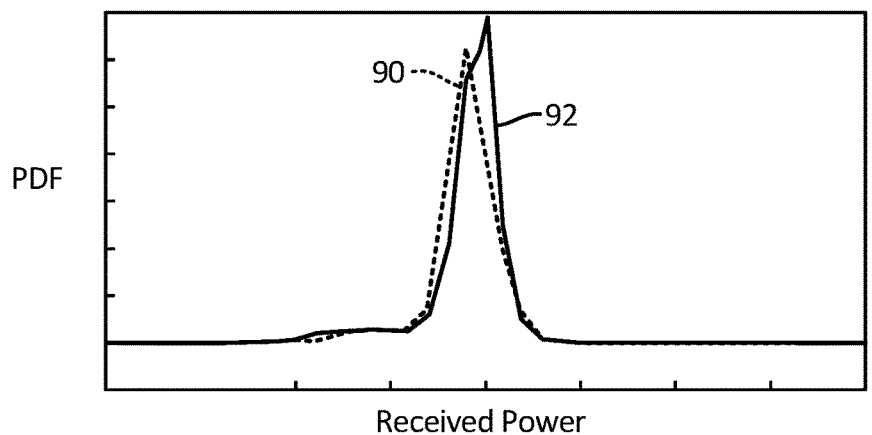
FIGS. 9A-9E are graphs comparing theoretical PDF and experimental PDF for a plurality of different occupants (e.g., 1, 3, 5, 7 and 9), respectively according to an embodiment of the present invention.

For example, FIG. 9A compares the observed/experimental probability density function (PDF) (labeled 90) generated in response to a single occupant, and finds a best fit theoretical PDF (labeled 92) by minimizing the KL divergence, wherein the best fit PDF has a value N=1.

Figure 9B:
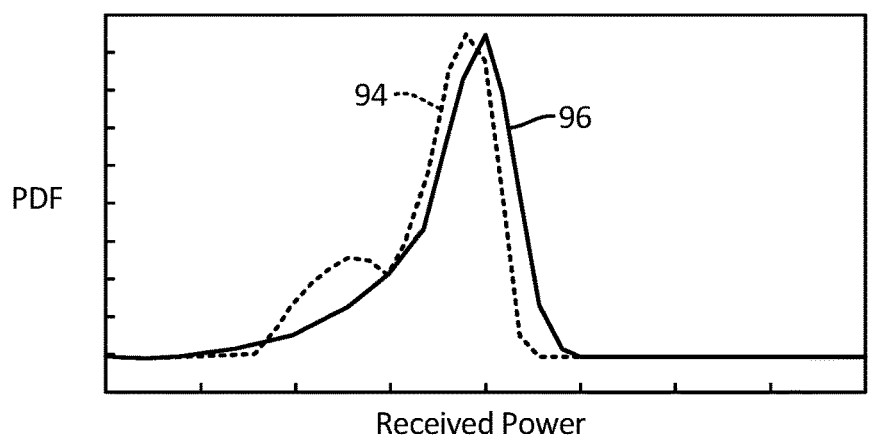

Likewise, FIG. 9B illustrates the observed/experimental PDF 94 generated in response to three occupants, and finds a best fit theoretical PDF 96 with N=3. That is, the theoretical PDF selected to minimize the KL divergence correctly estimates the number of occupants to be three.

Figure 9C:
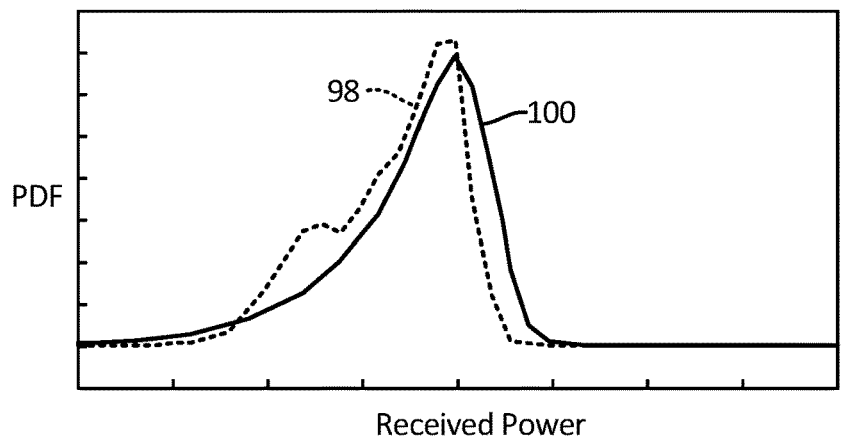

FIG. 9C illustrates the observed/experimental PDF 98 generated in response to five occupants, and finds a best fit theoretical PDF 100 with N=4. That is, the theoretical PDF selected to minimize the KL divergence slightly underestimates the number of occupants located in the monitored region, estimating four occupants rather than five.

Figure 9D:
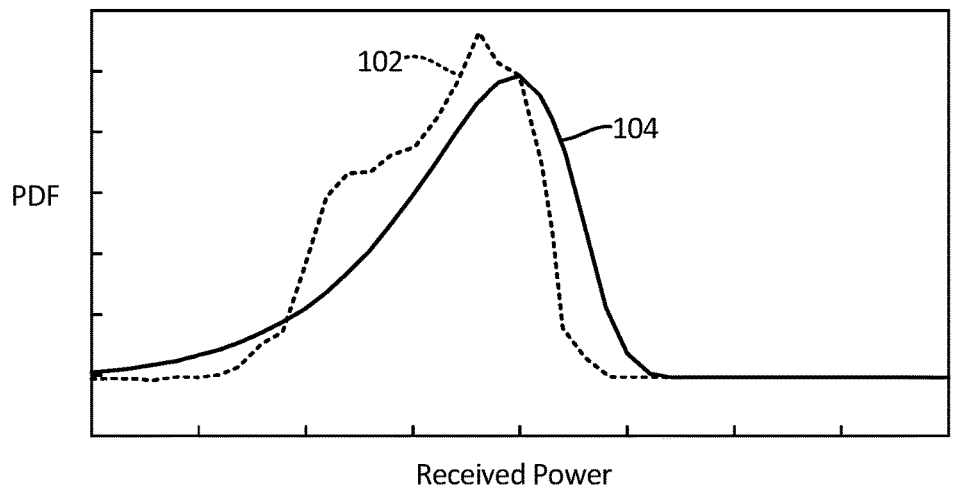

FIG. 9D illustrates the observed/experimental PDF 102 generated in response to seven occupants, and finds a best fit theoretical PDF 104 with N=7. That is, the theoretical PDF selected to minimize the KL divergence correctly estimates the number of occupants to be seven.

Figure 9E:
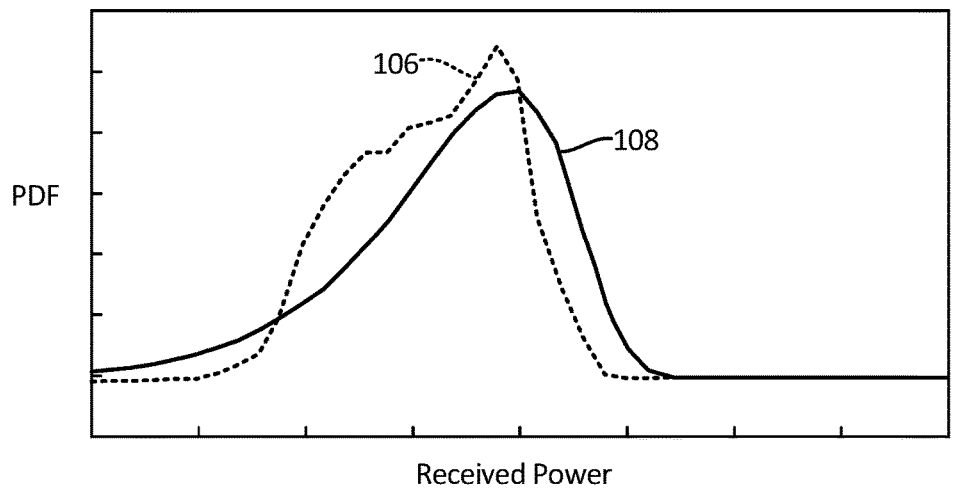

FIG. 9E illustrates the observed/experimental PDF 106 generated in response to nine occupants, and finds a best fit theoretical PDF 108 with N=8. That is, the theoretical PDF selected to minimize the KL divergence slightly underestimates the number of occupants located in the monitored region, estimating eight occupants rather than nine.

FIGS. 10 and 11 illustrate visually additional methods of estimating a number of occupants within a region based on a monitored attribute of the received signal and various types of models. As compared with the embodiment shown in FIG. 6, which utilized a theoretical model that accounted for LOS blocking to model the relationship between received signal attributes and number of occupants, the embodiments shown in FIGS. 10 and 11 describe other types of models that may be utilized. In particular, the embodiment shown in FIG. 10 utilizes a theoretical model that accounts for both LOS blocking and MP scattering/fading effects. The embodiment shown in FIG. 11 utilizes a theoretical model that relies on LOS blocking and MP scattering/fading effects associated with multiple communication links (i.e., multiple transmitter/receiver unit pairs).

FIG. 10 illustrates visually a method 110 of estimating a number of occupants within a region based on a monitored attribute of the received signal (e.g., received signal power) and line-of-sight (LOS) blocking and multi-path scattering/fading modeling. This is in contrast with the embodiment shown in FIG. 6, in which modeling accounted only for LOS blocking. In particular, the embodiment shown in FIG. 10 relies on probability density functions to compare the measured signal attributes with the derived model (e.g., Eq. 3 and 4 from above, which rely on both LOS blocking and MP scattering effects).

At step 112, one or more attributes of the received signal is measured. In this embodiment, a total of seven occupants are located in the monitored region during reception and measuring of a signal attribute associated with the received signal. In the embodiment shown in FIG. 10, the measured attribute is related to received signal power, which in one example is based on a RSSI measurement. Similar to that shown with respect to FIG. 5, the measured attribute is monitored for a selected duration of time (e.g., approximately 300 seconds).

At step 114, a probability density function (PDF) is calculated based on the measured attribute (i.e., received signal power).

At step 116, the probability density function (PDF) generated with respect to the measured signal attribute is compared with the PDF of the theoretical model. As described with respect to FIG. 3 (specifically, step 35), signal attributes are mathematically modeled as a function of the number of occupants in the monitored region. The mathematical modeling may take into account only LOS blocking effects, only MP scattering/fading effects, or both LOS blocking and MP scattering/fading effects. In this embodiment, the theoretical model is based on both LOS blocking effects and multi-path (MP) scattering/fading effect. The theoretical model shown at step 116 represents the theoretical model that best fits the shape of the measured/experimental results, although it should be understood that the quantized PMF will be compared to all theoretical models to find the one that provides the best fit. In this embodiment, the theoretical model selected estimate a total of seven occupants located in the monitored region. Thus the conclusion, based on the agreement or fit between the two lines is that the monitored region includes seven occupants (N=7), which in the example provided is accurate.

At step 118, the estimated number of occupants $N_{est,dir}$ is selected such that it minimizes the difference between the experimental and theoretical PMFs. In one embodiment, the KL divergence may be utilized, as described with respect to Eq. 6, above. As illustrated at step 118, the KL divergence is minimized at M=~7, thereby indicating that theoretical PDF shown at step 116 (estimating seven occupants) is indeed the best fit for the experimental results. In this example, seven occupants were located within the monitored region when the monitored attribute (i.e., signal power) was measured, resulting in an accurate estimation of number of occupants N in this case. In other embodiments, other metrics can be used to compare the two PDFs or in general find best estimate of number of occupants based on both measured attributes and derived models.

FIG. 11 illustrates visually a method 120 of estimating a number of occupants within a region based on a plurality of monitored attributes of the received signal (e.g., received signal power). In particular, the embodiment shown in FIG. 11 utilizes a first measured signal attribute measured by a first link (i.e., first transmitter/receiver pair) and a second measured signal attribute measured by a second link (i.e., second transmitter/receiver pair).

At step 122, one or more attributes of the first received signal is measured with respect to the first link. Simultaneously, at step 124 one or more attributes of the second received signal is measured with respect to the second link. In this embodiment, a total of ten occupants are located in the monitored region during reception and measuring of the first and second signal attributes. In the embodiment shown in FIG. 11, the measured attribute is related to received signal power, which in one example is based on a RSSI measurement. Similar to that shown with respect to FIG. 5, the measured attribute is monitored for a selected duration of time (e.g., approximately 300 seconds).

At step 126, a joint probability density function (PDF) is calculated based on the measured attributes of the first received signal and the second received signal. The joint PDF is represented at step 126 as a three-dimensional topography, with the horizontal axes representing the measured signal attributes associated with the first received signal and the second received signal, and the vertical axis representing the probability density function.

At step 128, the joint probability density function (PDF) generated with respect to the first measured signal attribute and second measured signal attribute (i.e., experimental joint PDF) is compared with a joint PDF of the theoretical model. For the sake of simplicity, the comparison of the three-dimensional PDFs is not illustrated visually at step 128. Once again, the theoretical PDF may be based on mathematical models that take into account the effects of LOS blocking only, MP scattering/fading only, or a combination of both. The theoretical PDF that best fits or matches the experimental PDF is selected, with the number of occupants associated with the best-fit theoretical PDF representing the occupancy estimate.

At step 130, the estimated number of occupants $N_{est,dir}$ is selected such that it minimizes the difference between the experimental and theoretical PDFs. In the embodiment shown in FIG. 11, the KL divergence is once again utilized to find the best fit between the experimental PDF and the theoretical PDF. However, in other embodiments various other means may be utilized to find the best fit. As illustrated at step 130, the KL divergence is minimized at M=~10. For occupancy estimates less than ten, and greater than ten, the KL divergence increases, indicating a poor fit.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of estimating a number of occupants in a region, the method comprising:
receiving at one or more receiving units a signal transmitted from one or more transmitting units, wherein the transmitting units are not associated with the one or more occupants located in the region;
measuring one or more attributes of the received signal;
estimating the number of occupants in the region based, at least in part, on the measured attributes of the received signal and a relationship that relates measured attributes and number of occupants to one another, wherein the relationship is a theoretical model, a heuristic relationship, a relationship developed from past measurements and learning, or a relationship developed from simulations.

2. The method of claim 1, wherein the number of occupants in the region is estimated, at least in part, based on the measured attributes of the received signal and a relationship that relates functions of the signal attributes and number of occupants to one another.

3. The method of claim 1, wherein the relationship utilizes a statistical or probabilistic function, a probability distribution function, a probability mass function, a correlation function, or a covariance function.

4. The method of claim 1, wherein the measured signal attributes are expressed statistically, probabilistically, as a probability density function, a probability mass function, or as a correlation function.

5. The method of claim 1, wherein the relationship includes modeling of motion behaviors of occupants within the monitored region.

6. The method of claim 1, wherein the signal is a radio frequency (RF) signal, or a Wi-Fi signal, or a Bluetooth signal, or a cellular signal.

7. The method of claim 1, wherein the one or more attribute of the received signal includes at least one of received signal strength, received signal strength indicator (RSSI), signal-to-noise ratio (SNR), received channel power indicator (RCPI), or received signal phase.

8. The method of claim 1, wherein the attributes of the received signal are measured over a period of time.

9. The method of claim 1, wherein the estimation is based, in part, on the line-of-sight (LOS) blocking/crossing of the received signal, or multi-path (MP) scattering/fading of the received signal, or both LOS blocking/crossing and MP scattering/fading.

10. A method of detecting presence or absence of occupants in the region, the method comprising:
receiving at one or more receiving units a signal transmitted from one or more transmitting units, wherein the transmitting units are not associated with the one or more occupants located in the region;
measuring one or more attributes of the received signal; and
detecting a presence/absence of occupants in the region based, at least in part, on the measured attributes of the received signal and a relationship that relates measured attributes and the presence/absence of occupants to one another, wherein the relationship is a theoretical model, a heuristic relationship, a relationship developed from past measurements and learning, or a relationship developed from simulations.

11. The method of claim 10, wherein the detection is based, in part, on the multi-path (MP) scattering/fading, or the line-of-sight (LOS) blocking/crossing of the received signal, or both the multi-path (MP) scattering/fading and the line-of-sight (LOS) blocking/crossing of the received signal.

12. The method of claim 10, wherein the one or more attribute of the received signal includes at least one of received signal strength, received signal strength indicator (RSSI), signal-to-noise ratio (SNR), received channel power indicator (RCPI), or received signal phase.

13. The method of claim 10, wherein the signal is a radio frequency (RF) signal, or a Wi-Fi signal, or a Bluetooth signal, or a cellular signal.

14. A method of estimating a number of occupants in the region, the method comprising:
generating baseline parameters that describe the effect occupancy has on signal attributes and storing the generated baseline parameters;
generating a relationship that relates measured attributes of the received signal and number of occupants to one another, wherein the relationship is a theoretical model, a heuristic relationship, a relationship developed from past measurements and learning, or a relationship developed from simulations;

receiving at one or more receiving units a signal transmitted from one or more transmitting units, wherein the transmitting units are not associated with the one or more occupants located in the region;

measuring one or more attributes of the received signal; and estimating the number of occupants in the region based, at least in part, on the measured attributes of the received signal and the generated relationship.

15. The method of claim 14, wherein generating the baseline parameters includes one or more of simulating the baseline parameters, measurement of signal attributes in an initialization stage, and/or utilizing a table lookup of the baseline parameters based on characteristics of the region such as geometry of the region to be monitored and location of the one or more transmitter units and the one or more receiver units.

16. The method of claim 14, wherein measurement of signal attributes in an initialization stage includes measuring signal attributes with an integer number of occupants located in the region of interest or in similar regions, to generate baseline parameters.

17. The method of claim 16, wherein the integer number of occupants is varied during the initialization stage.

18. The method of claim 14, wherein the baseline parameters are utilized to generate one or more functions representative of how the one or more measured attributes is related to the number of occupants.

19. The method of claim 18, wherein estimating the number of occupants includes finding a best fit between a function representative of the one or more measured attributes and one of the functions representative of how the one or more measured attributes is related to number of occupants.

* * * * *